Jan. 22, 1929.
J. A. CONTERIO
1,699,687
PROPELLING MECHANISM
Filed March 10, 1925
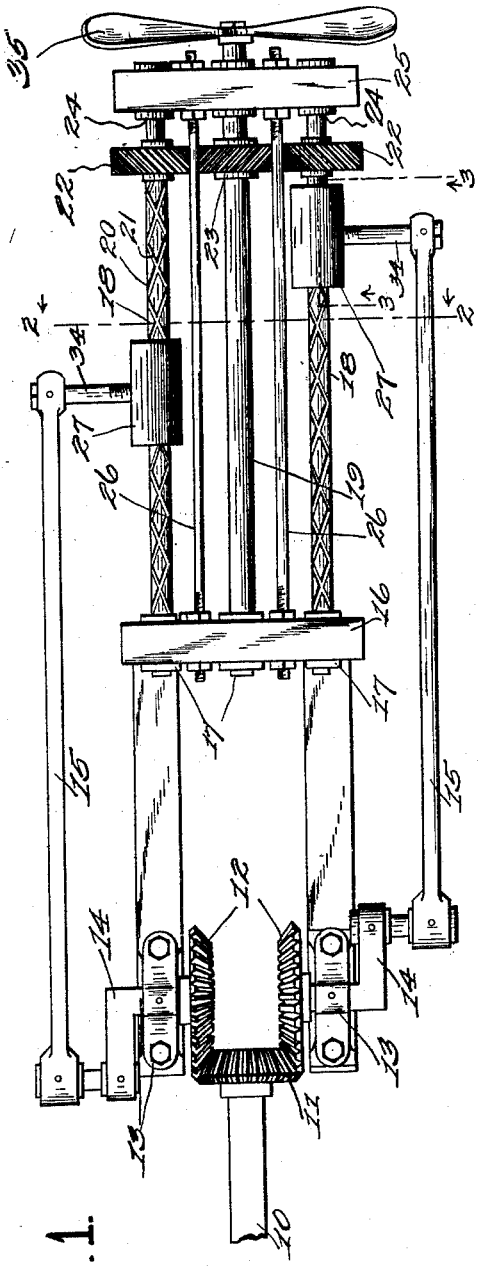
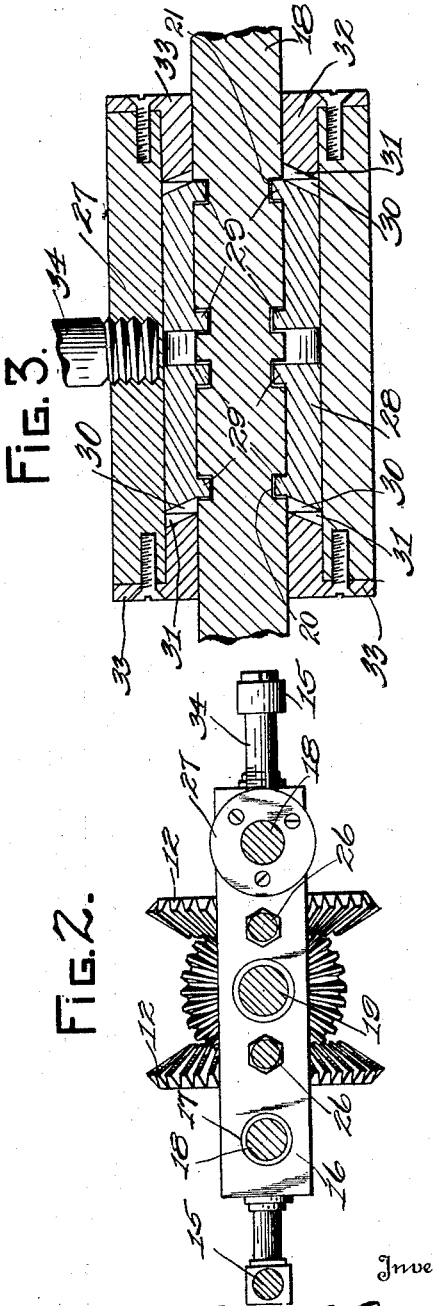
Inventor
James A. Conterio.
By *Ignaco C. Chandler*
Attorney Patented Jan. 22, 1929.

1,699,687

UNITED STATES PATENT OFFICE.

JAMES A. CONTERIO, OF CHICAGO, ILLINOIS.

PROPELLING MECHANISM.

Application filed March 10, 1925. Serial No. 14,491.

This invention relates to new and useful improvements in propelling mechanisms, and particularly to propelling mechanisms for airships, water craft, and the like.

One object of the invention is to provide a mechanism of this character which is simple in construction, effective and powerful in operation.

Another object is to provide a novel propelling mechanism which is capable of operation by human or motor power.

A further object is to provide a mechanism of this character wherein rotary motion is translated into reciprocatory, and thence into rotary motion.

Other objects and advantages will be apparent from the following description when taken in connection with the accompanying drawing.

In the drawing:

Figure 1 is a top plan view of the propelling mechanism, made in accordance with the present invention.

Figure 2 is a vertical transverse sectional view on the line 2—2 of Figure 1.

Figure 3 is an enlarged vertical longitudinal sectional view on the line 3—3 of Figure 1.

Referring particularly to the accompanying drawing, 10 represents the main or master drive shaft which receives its power from any suitable motor, not shown, but which will be readily understood. On this shaft 10 is a bevel gear 11 which meshes with the pair of bevel gears 12 on the crank shafts 13, which extend at right angles to the shaft 10. On each of these shafts 13 is a crank arm 14, and operatively connected to each of the crank arms is a pitman rod or link 15. Disposed rearwardly of the shafts 13 is a block 16, in which are disposed suitable antifriction bearings 17, within which are journaled the adjacent ends of the longitudinal parallel shafts 18 and 19, the latter being disposed intermediate the shafts 18. Each of the shafts 18 is formed with the reversely wound spiral grooves 20 and 21, and on the rear end of each of these shafts 18 is secured a gear 22 which meshes with a similar, but slightly smaller gear 23, on the corresponding end of the shaft 19, and whereby the rotary motion of the grooved shafts 18 is transmitted to this shaft 19. The rear ends of the shafts 18 and 19 are properly journaled in bearings 24, mounted in the block 25. Spacing rods 26 are secured to and extend between the blocks 16 and 25.

Slidable longitudinally on each of the grooved shafts 18 is a cylindrical sleeve or casing 27, within which are arranged the pair of sleeves 28. Each of the sleeves 28 is formed with a pair of inwardly projecting lugs 29 engaging in the grooves of the shaft, while the outer end of each sleeve is formed with a series of clutch teeth 30 for engagement with the clutch teeth 31 formed on the inwardly projecting collar portion 32, of the end plate 33, of the casing 27. The sleeves 28 are spaced apart a sufficient distance to permit one sleeve to be disengaged from the adjacent clutch teeth 31, while the other sleeve is operatively engaged with the other clutch teeth. Carried by each of the casings 27, and projecting laterally therefrom, is a pin 34, with which is operatively connected the adjacent end of a pitman rod 15.

Rotation of the shaft 10 transmits motion to the shafts 13, through the medium of the gears 11 and 12, and through the medium of the crank arms 14 and the pitmen 15, the casings 27 are reciprocated longitudinally on the shafts 18, with the result that the sleeves 28 engage their lugs 29 in the grooves of the shafts, causing the rotation of said shafts and the driving of the shaft 19. The arrangement of the two sleeves 28 provides that the shafts 18 will be rotated in the same direction, while the casings 27 move longitudinally in either direction.

On the rear end of the intermediate shaft 19 is mounted a suitable propeller 35, which is driven constantly in the same direction, through the motion transmitted from the shafts 18 to the shaft 19, by the gears 22 and 23.

It will be understood that the crank arms 14 may represent the pedals of a bicycle driving gear, in which event the shaft 10 and gears 11 and 12 will be dispensed with and the shafts 13 formed in one piece.

What is claimed is:

1. A driving mechanism embodying in its construction a pair of spaced parallel shafts mounted to rotate in bearings provided for their respective ends, a shaft mounted between said pair of shafts and adapted to be rotated thereby through the medium of meshing gears, and means for simultaneously rotating said pair of shafts in the same direction comprising spirally arranged intersecting grooves on each of said pair of shafts, casings slidably mounted thereon having means for reciprocating the same, and a pair of separated internal sleeves for each of said casings having lugs engaging in said grooves, the sleeves in each casing being mounted to freely rotate in opposite directions, and clutching means locking the same to the casings for preventing their rotation in a direction reverse to that in which they are free to rotate, whereby their respective lugs engaging in the spirally arranged intersecting grooves of the said pair of shafts will impart a drive to said shafts when the casings are reciprocated on both directions thereon.

2. A driving mechanism comprising a pair of spaced and co-axially disposed driving gears, a drive shaft having a pinion on the end thereof meshing with said driving gears, a crank arm for each of said driving gears, a pitman rod for each crank arm, a pin mounted on the end of each of said pitman rods and projecting at right angles thereto, sliding casings to which each of said pins are connected, spaced parallel shafts on which said casings are mounted, spiral grooves on said shafts with means within the casings engaging in said grooves for imparting rotation to the shafts, and a driven shaft mounted between said spaced parallel shafts having a gear on the end thereof meshing with a gear mounted on each of said spaced parallel shafts.

In testimony whereof, I affix my signature.

JAMES A. CONTERIO.